Figure 1:
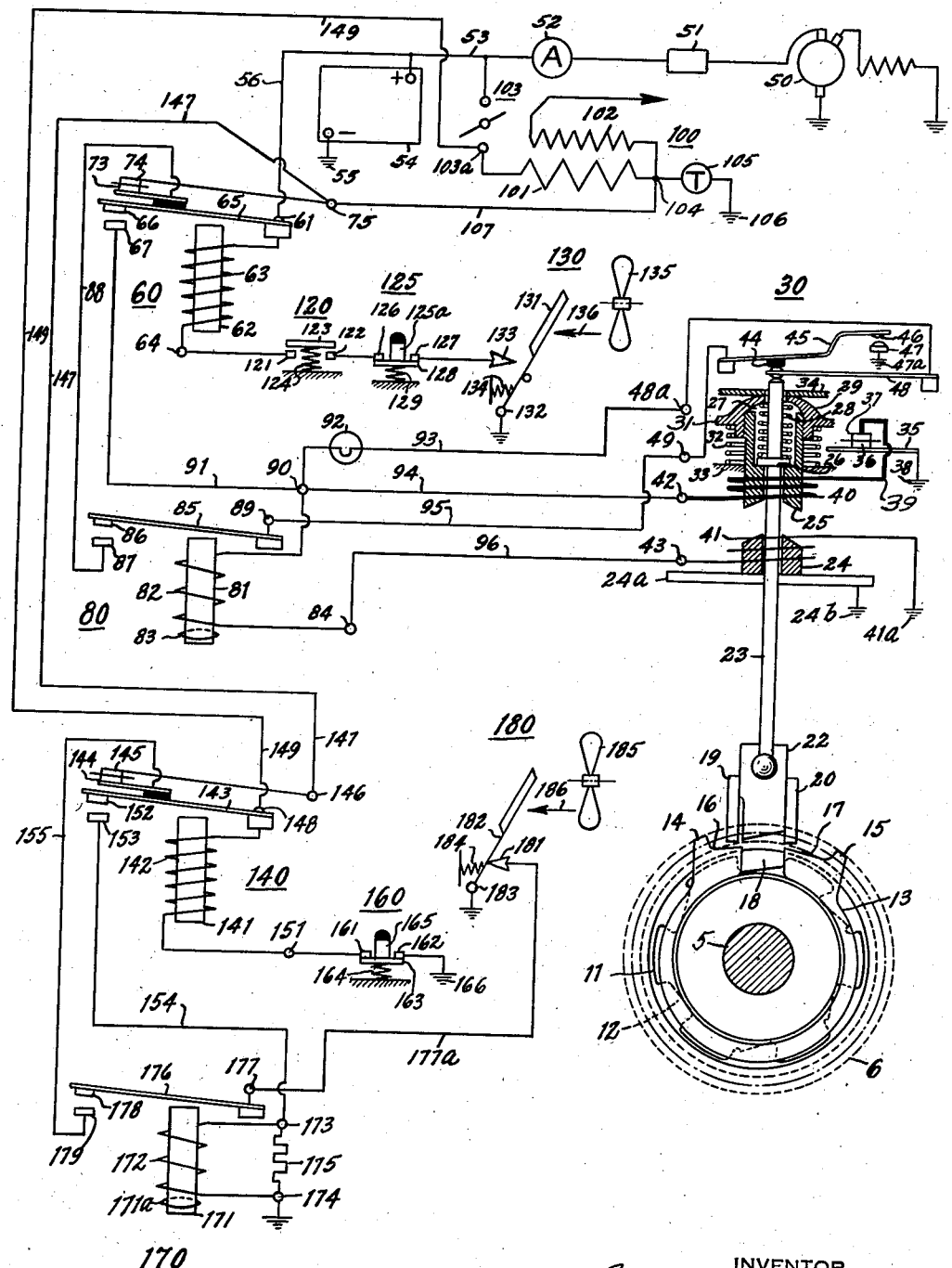

Oct. 7, 1941.  E. M. CLAYTOR  2,257,838
IGNITION CONTROL SYSTEM
Filed March 25, 1940

INVENTOR
Edward M. Claytor
BY
Spencer Hardman & Fehr
his ATTORNEYS

Patented Oct. 7, 1941

2,257,838

UNITED STATES PATENT OFFICE 2,257,838

IGNITION CONTROL SYSTEM

Edward M. Claytor, Anderson, Ind., assignor to General Motors Corporation, Detroit, Mich., a corporation of Delaware Application March 25, 1940, Serial No. 325,705

6 Claims. (Cl. 74—472)

This invention relates to electrical systems for controlling an automobile overdrive and more particularly to electrically operated means for momentarily rendering the engine inoperative in order to facilitate the automatic function of the overdrive mechanism when shifting from one chain of gears to another.

In my copending application Serial No. 290,356 filed August 16, 1939, I disclose a time-lag or measured-time relay which is preconditioned for operation when going into overdrive so that, automatically in response to a driver operation of the control system for the purpose of coming out of overdrive, the measured-time relay functions to render the engine ignition inoperative for a predetermined time interval sufficient to facilitate the automatic functioning of the overdrive mechanism in coming out of overdrive. The system of my application Ser. No. 290,356 operates to go into overdrive above a predetermined vehicle speed when the regular transmission gears are in high speed (1 to 1 gear ratio) position.

The object of the present invention is to provide an auxiliary control system by which momentary disabling of the engine ignition can be effected at a speed in a speed range lower than the speed range within which the automatic change from one-to-one gear ratio to an overdrive gear ratio is effected by the type of mechanism disclosed in my application Ser. No. 290,356. Such auxiliary control system would be useful, for example, in facilitating the functioning of an automatic mechanism which controls the change between the second or intermediate speed gear train and the third or normal high speed gear train, for example, according to vehicle speed.

Further objects and advantages of the present invention will be apparent from the following description, reference being had to the accompanying drawing wherein a preferred embodiment of the present invention is clearly shown.

In the drawing:

Fig. 1 is a wiring diagram disclosing an embodiment of my invention.

A shaft 5 driven by the engine through one of the gear trains of the regular change speed gearing of the automobile, transmits power either through a 1 to 1 ratio drive to the propeller shaft or through an overdrive which includes concentric rings and sun gears and intermediate planet gears, the sun gear being held stationary when the overdrive operates. As this form of overdrive is known to those skilled in this art, only the sun gear 6 is shown. The mechanism for holding the gear 6 stationary comprises locking pawl 22 received by one of a series of notches 12 in a ring 11 attached to sun gear 6. The pawl 22 is normally maintained out of engagement with the ring 11 by a pawl rod 23 which is controlled in a manner to be described. Movement of the pawl 22 into engagement with the ring 11 is obstructed, except under certain conditions, by a blocker plate 13 which is frictionally dragged by ring 11. The blocker plate 13 is provided with stop lugs 14 and 15 which project beyond stop surfaces 16 and 17 which may be engaged under certain conditions by the pawl 22. The surfaces 16 and 17 are interrupted by a notch 18 of sufficient width to permit movement of the pawl 22 between the surfaces 16 and 17 when the notch 18 is brought into alignment with the pawl 22. The pawl 22 is guided between bosses 19 and 20 of the frame 21 of the overdrive mechanism. Bosses 19 and 20 project into the plane of the blocker plate 13 so as to be engaged by lugs 14 and 15, respectively. When the ring 11 rotates clockwise, the blocker plate 13 will be frictionally dragged clockwise until its lug 14 strikes the boss 19, and further movement of the blocker plate 13 in the clockwise direction will cease. When the ring 11 rotates counterclockwise, the blocker plate 13 will be frictionally dragged counterclockwise until its lug 15 engages the boss 20 whereupon counterclockwise movement of the plate 13 will cease.

The sun gear locking pawl 22 is attached to a pawl rod 23 forming part of a solenoid unit 30. Rod 23 extends through stationary core 24 and through a solenoid armature 25. Rod 23 has a shoulder portion 26 located within a recess 27 provided by the armature 25. Recess 27 houses a coil spring 28 located in a state of compression between the shoulder 26 and a nut 29 threadedly attached to the armature 25. Nut 29 has a flange 31 engaged by coil spring 32 located in a state of compression between flange 31 and a stationary member 33. Spring 32 normally urges the nut 29 against a stationary plate 34. Flange 31 is engageable with a resilient contact arm 35 carrying a contact 36 normally engaged with a contact 37. Arm 35 is grounded at 38. Contact 37 is connected by a wire 39 with the main attracting coil 40 of the solenoid connected with a terminal 42. Coil 40 is a series coil comprising a relatively small number of turns of relatively coarse wire. Terminal 43 is connected with solenoid holding coil 41 which comprises a relatively large number of turns of fine wire. Holding coil 41 is grounded at 41a. The rod 23 extends through the nut 31 and the stationary stop plate 34 to engage leaf spring contact 48 connected with a terminal 48a. Contact 48 engages a nonconducting block 44 attached to a resilient contact arm 45 carrying a contact 46 normally out of engagement with contact 47 which is grounded at 47a. Arm 45 is connected with a terminal 49.

A generator 50 is connected through a reverse circuit relay 51, an ammeter 52 and a wire 53 with a storage battery 54 grounded at 55. A wire 56 connects wire 53 with terminal 61 of a relay 60. Relay 60 comprises a core 62 surrounded by a magnet winding 63 connected with terminal 61 and with a terminal 64. Terminal 61 is connected with an armature 65 normally resiliently urged away from the core 62. Armature 65 carries a contact 66 for engaging a contact 67. Armature 65 insulatingly supports a contact 73 normally engaging a contact 74 connected with a terminal 75.

Numeral 80 designates a measured time relay having a core 81 surrounded by a magnet coil 82 connected with terminals 84 and 90. Core 81 cooperates with an armature 85 normally biased away from the core and carrying a contact 86 engageable with a contact 87 connected by a wire 88 with contact 73 of relay 60. A short circuited coil 83 surrounds core 81 for the purpose to be described later.

Wire 91 connects contact 67 of relay 60 with terminal 90. Indicator lamp 92 and wire 93 are connected between terminals 90 and 48a. Wire 94 connects terminals 90 and 42. Wire 95 connects terminals 89 and 49. Wire 96 connects terminals 84 and 43.

Numeral 100 designates an ignition coil having a primary 101 and a secondary 102. Primary 101 is connected with wire 53 through an ignition switch 103. Primary 101 is connected with a terminal 104 and with an ignition timer 105 grounded at 106. Terminal 104 is connected by a wire 107 to the terminal 75 of relay 60.

Terminal 64 of relay 60 is connected with a gear switch 120 having stationary contacts 121 and 122 adapted to be bridged by movable contact 123 held out of engagement with stationary contacts by a spring 124. The gear switch 120 is closed by mechanism for controlling the connection of certain trains of gears between the engine shaft and the propeller shaft of the automobile. For example, switch 120 may be closed by mechanism which is actuated when the manually operated gear shaft lever is in high speed position.

Switch 120 is connected with kick switch 125 comprising stationary contacts 126 and 127 normally engaged by contact 128 held normally in contact closing position by a spring 129. The switch 125 is opened by a suitable pedal cooperating with a switch actuating rod 125a. This pedal may be the engine throttle or accelerator pedal which causes the switch 125 to open by movement of accelerator pedal beyond wide open throttle position.

Switch 125 is connected with a ground through a switch responsive to vehicle speed such as an air switch 130 having a grounded vane 131 pivoted at 132 maintained normally out of engagement with contact 133 by a spring 134. The vane 131 is moved into engagement with contact 133 by the action of an air current provided by the engine cooling fan 135 which causes a current of air to impinge upon the vane 131 as indicated by the arrow 136.

The operation of the overdrive control system included in Fig. 1 is as follows: While the engine is running the ignition switch 103 will be closed. When the vehicle transmission is set to drive through the normal high speed (1 to 1 ratio) gear train, the switch 120 will be closed. When the vehicle speed attains a certain value such as 25 M. P. H. for example, the air switch 130 will be closed. As stated before, switch 125 is normally closed. All three switches 120, 125 and 130 being closed, the winding 63 of relay 60 will receive current from the battery 54 thereby causing armature 65 to be attracted and contacts 66 and 67 to be engaged. Movement of contact 65 toward core 62 causes contact 73 to be separated from contact 74 thereby interrupting any ground connection which could be made with terminal 104 between timer 105 and coil 100.

When contact 66 engages contact 67 the solenoid magnets 40 and 41 will be connected with the battery through the following circuit: Battery 54, wire 56, terminal 61, armature 65, contact 66, contact 67, wire 91, terminal 90, wire 94, terminal 42, winding 40, contact 37, contact 36, arm 35, ground 38 and battery ground 55. From terminal 90 there is a branch circuit through windings 81 and 41 to ground 41a. Both windings 40 and 41 cooperate to attract solenoid armature 25 toward core 24. As armature 25 moves downwardly, it carries with it the nut 29 which urges the upper end of the spring 28 downwardly thereby tending to move the rod 23 downwardly.

When the solenoid is not excited, the spring 32, acting through the pawl rod 23, keeps pawl 22 out of engagement with the blocker plate 13. When the engine drives the transmission, the ring 11 moves counterclockwise as viewed in Fig. 1 and the plate 13 is frictionally dragged counterclockwise so that its lug 15 engages boss 20 thereby causing surface 17 to be in the path of movement of the pawl 22. When the engine speed is increased to the speed where the governor switch 130 closes, the hand controlled change speed gearing being in high gear, the solenoid will be energized in the manner described. The pawl 22 is then urged downwardly by spring 28 and presses against surface 17. Engagement of the pawl 22 with the notched locking ring 11 is prevented until the speed of ring 11 is reduced to zero and the rotation of ring 11 reverses.

The reversal of ring 11 is effected by a reduction of engine speed (measured in miles per hour of vehicle speed) below vehicle speed by a predetermined amount dependent upon the gear ratio of overdrive to normal drive. For example, if the overdrive increases the speed ratio between vehicle drive wheels and the engine by 30%, the engine speed must be reduced below vehicle speed by the amount of 30% of vehicle speed. Assuming the vehicle is being propelled through normal drive at 40 M. P. H. and it is desired to go into overdrive, the driver releases the accelerator pedal to permit engine speed to decrease. The vehicle "free wheels" (through an overrunning clutch, not shown, connected between the shaft 5 and the ring gear of the overdrive) at a speed starting at 40 M. P. H. and diminishing slightly due to resistance of wind and friction to about 35 M. P. H. Meanwhile the engine speed has diminished to 24 M. P. H., which speed is slightly more than 30% less than 35 M. P. H., the concurrent vehicle speed. As the engine speed decreases to 24 M. P. H., the speed of ring 11 is reduced to zero and then the ring 11 starts to reverse in direction of rotation or to move clockwise as viewed in Fig. 1. As ring 11 begins to move slowly clockwise, it drags frictionally the blocker plate 13 clockwise thereby causing its lug 15 to move away from the boss 20 and its notch 18 to become aligned with pawl 22 thereby permitting spring 28 to press pawl 22 against a tooth of ring 11. As ring 11 continues to rotate, it brings a notch 12 into alignment with pawl 22 thereby permitting spring 28 to press pawl 22 into locking engagement with the ring 11 thereby locking sun gear 6. While the sun gear 6 is locked, transmisison of power from the shaft 1 to the propeller shaft takes place through the overdrive comprising planet gears (not shown), moved orbitally by shaft 15 around the sun gear 6, and a ring gear (not shown) driven by the planet gears at a speed greater than the speed of shaft 5.

During movement of the solenoid armature 25 toward the core 24 in order to preload the spring 28 so that it may push the pawl 22 into a notch 12 of the sun gear locking ring 11 when the blocker 13 is retracted, the flange 31 of nut 29 engages the resilient contact arm 35 thereby separating contact 36 from contact 37 and breaking the circuit through the main attracting coil 40 of the solenoid. The armature 25, being then in relatively close proximity with the core 24, is held in the attracted position by the holding coil 41.

When contacts 66 and 67 of relay 60 are closed, winding 82 of relay 80 is connected with the battery 54. Armature 85 is attracted toward core 81 to cause the contact 86 to engage contact 87. Armature 85 seats on core 81 for a purpose to be described.

During downward movement of pawl rod 23, the downwardly biased resilient arm 45 causes contact 46 to move into engagement with contact 47. The circuit for grounding the ignition apparatus and thereby rendering it inoperative comprises wire 107 connecting terminals 104 and 75, contacts 74 and 73 of relay 60, wire 88, contacts 87 and 86 of relay 80, armature 85, terminal 89, wire 95, terminal 49, arm 45, and contacts 46 and 47. While the pawl 22 engages the sun gear locking ring 11 to render the overdrive operative, the pairs of contacts 46—47 and 86—87 are closed while the pair of contacts 73—74 are open. Therefore the ignition apparatus remains operative. When the driver desires to render the overdrive inoperative, he presses the kick switch rod 125a to interrupt the flow of current through the winding 63 of the relay 60, whereupon the armature 65 returns to normal position separating contacts 66—67 and reengaging contacts 73—74. This interrupts the flow of current through the magnet winding 82 of relay 80 and through the solenoid holding coil 41, thereby permitting relay 80 and solenoid armature 25 to return to normal positions.

The ignition is momentarily rendered inoperative because relay 80 delays separation of contacts 86—87 for a brief interval, thus rendering the engine inoperative and thereby producing a condition favorable to the retraction of pawl 22 by spring 32. When the holding coil 41 is deenergized, spring 32, by operating through the nut 27, and the nut 27, by operating on the shoulder 26 tends to cause the pawl rod 23 and the pawl 22 to be restored to normal position. During upward movement of rod 27, the resilient contact arm 35 is relieved from engagement with the flange 31 of nut 29, thereby permitting the contact 36 to reengage the contact 37.

A predetermined time after the separation of the contacts of relay 60, the contact 86 of relay 80 returns to normal open position and operation of the ignition is restored. This predetermined time is measured or determined by the relay 80. The lag or time delay between the opening of contacts 66 and 67 of relay 60 and the opening of contacts 86 and 87 of relay 80 is effected by causing the armature 85 to seat or seal against the core 81 of relay 80 when its contacts are closed, thereby making it necessary for the magnetic flux in the core 81 to diminish substantially to zero before the armature 85 is released. The decay of flux in the core 81 is retarded by the short circuited coil 83 and also by reason of the fact that the inductive kick (self-induced voltage) from holding coil 41, which occurs at the instant of separation of contacts 66—67 of relay 60, acts upon coil 82 in such direction as to produce a flux assisting the original flux in core 81. During this measured time interval between the opening of contacts 86—87 of relay 80, the ignition terminal 104 is grounded due to the fact that all of the pairs of contacts 73—74, 86—87 and 46—47 are then closed. The grounding of the ignition coil 100 eliminates the igniting of several charges of fuel thereby causing the engine to cease to drive the vehicle and thereby relieving the torque reaction between the sun gear locking ring 11 and the pawl 22 in order to facilitate retraction of the pawl by the spring 32.

The pawl 22 having been relieved of a pressure placing a frictional drag on the pawl, the pawl 22 and its rod 23 move upwardly due to the action of the spring 32. By the time that the pawl 22 has been fully retracted from the sun gear locking ring 11, the rod 23 will have actuated the insulating button 44 of the contact arm 45 thereby causing contact 46 to move out of engagement with contact 47, thereby interrupting the grounding circuit of the ignition terminal 104. Therefore, as soon as the locking pawl 22 has been fully retracted from the sun gear locking ring 11, the ignition grounding circuit will be broken. Under normal conditions the contacts 46—47 will open sooner than the contacts of relay 80. However, the opening of the contacts 46—47 is contingent upon the retraction of the sun gear locking pawl 22 by the spring 32. In case the pawl 22 is not retracted for any reason, such as failure of the return spring 32, the relay 80 finally operates to interrupt the ignition grounding circuit, thereby causing the ignition to be reestablished regardless of whether the overdrive has been rendered inoperative. Therefore the circuit operates whenever the driver desires to come out of overdrive in a manner such as to disable the ignition in order to facilitate coming out of overdrive under normal conditions. However, in case of failure of the vehicle transmission to come out of overdrive, the ignition is reestablished after a time which should be sufficient for the vehicle transmission to come out of overdrive under normal circumstances. In other words, under normal conditions, the contacts 46—47 open ahead of the contacts of relay 80 to interrupt the ignition grounding circuit. But, should the contacts 46—47 fail to open to reestablish the ignition circuit, the relay 80 will eventually open after a measured time interval in order that the engine may be provided with ignition regardless of failure of the vehicle transmission to come out of overdrive.

The signal lamp 92 burns to indicate the closing of contacts 66—67 of relay 60 to close the circuit of the solenoid winding 40—41. Lamp 92 ceases to burn when rod 23 descends to move pawl 22 into locking position, thereby indicating, by ceasing to burn, that the transmission is in overdrive.

There is a time interval of appreciable duration between the rendering of the ignition inoperative and the restoration of the ignition to operative condition; consequently, there have been brought about two separate instances where conditions are favorable to the retraction of the pawl from sun gear locking position by the pawl returning spring. I shall explain first the instance where the ignition is rendered inoperative. It will be understood there is a certain amount of lost motion or side play between the pawl 22 and the sides of a notch 12 of the locking ring 11. While the engine ignition is operative and the engine drives the vehicle, the torque transmitted by the engine to the vehicle drive wheels is what may be termed positive torque. When the engine ignition is rendered inoperative, the vehicle tends to drive the engine and the transmission of torque is reversed. This reversed torque may be termed negative torque. When positive torque is present the pawl 22 will press against one side of a notch 12 and, when negative torque is present, the pawl 22 will press against the other side of the notch 12. It is obvious that, if the ignition is rendered inoperative causing the engine to cease to fire, the torque will change from positive to negative and the pawl 22 will move from a position where it presses against one side of the notch 12 to a position where it presses against the other side of the notch. During the period of time of relative sidewise movement between the notch 12 and the pawl 22 in which the pawl 22 relatively moves from one side of the notch 12 to the other, there is a condition where there is no binding force between the ring 11 and pawl 22 to resist withdrawal of the pawl 22 by the pawl return spring 32. This change from positive torque to negative torque produces a condition which is favorable to the retraction of the pawl 22 from the ring 11.

Obviously the duration of this condition is relatively short, since it continues only long enough for the pawl to leave one side of the notch, traverse the lost motion space between the sides of the notch and then engage the opposite sides of the notch. Under some unusual circumstances, this period of short duration might not be sufficient for the pawl 22 to be completely withdrawn from the sun gear locking ring 11. However, another instance of favorable conditions for retraction of the pawl 22 by the spring 32 is afforded.

At the end of the measured time interval provided by relay 80 during which the ignition may be inoperative, there is another condition of no binding between the pawl 22 and ring 11 at the instant when the ignition apparatus is rendered operative, because there is another reversal of torque from negative torque to positive torque. Therefore, the system provides two instances which are favorable to the retraction of the pawl 22 of the sun gear locking ring 11. Therefore there are two opportunities for the pawl 22 to be retracted.

The apparatus thus far described takes care of the change from normal third or high speed (1 to 1) gear ratio to an overdrive gear ratio and back again. I wish also to provide for the momentary interruption of engine torque in order to facilitate the change in gear ratio which might be brought about automatically while the vehicle is operating at speeds lower than the speed at which the overdrive could be rendered operative. For example, the power transmission from the engine might include means responsive to vehicle speed for automatically shifting from a second speed to a third speed. In such case, it is necessary that such automatic change speed mechanism be relieved of engine torque during the transition between gear trains. Therefore, I provide an auxiliary electrical system including a measured-time relay which, in response to the closing of the ignition switch, is so preconditioned that, when it is desired to shift from a gear train of one ratio to a train of another ratio, the engine ignition is rendered inoperative momentarily so that this shifting will be facilitated.

This auxiliary electrical system includes a control relay 140 having a core 141 surounded by a magnet coil 142 connected with terminals 148 and 151, and an armature 143 connected with terminal 148 and carrying insulatingly a contact 144 normally engaging a contact 145 connected with a terminal 146 connected by wire 147 with terminal 75 of relay 60. Terminal 148 is connected by wire 149 with contact 103a of ignition switch 103. Armature 143 carries contact 152 normally disengaged from contact 153 connected with wire 154. Contact 144 is connected with wire 155.

Terminal 151 of relay 140 is connected with foot operated switch 160 having stationary contacts 161 and 162 normally bridged by movable contact 163 urged by spring 164 against contacts 161 and 162, and moved away from said contacts by a plunger 165 which might be pushed down, for example, by movement of the accelerator pedal to an extreme position nearest the toe-board. Contact 162 is grounded at 166.

Relay 140 controls a measured-time relay 170 comprising a core 171, a coil 172, connected between terminals 173 and 174, and an armature 176 connected to terminal 177 and carrying a contact 178 normally disengaged from a contact 179 connected with wire 155. Wire 154 is connected with terminal 173. Terminal 174 is grounded. A non-inductive resistance 175 connected between terminals 173 and 174 operates to resist decay of flux of the relay 170 when the circuit between the battery 54 and the magnet coil 172 is broken at contacts 152 and 153 of control relay 140. The short circuited coil 171a around core 171 also operates to resist flux decay.

Terminal 177 is connected by wire 177a with a vehicle speed responsive air switch 180 comprising a stationary contact 181 and an air-vane contact 182 normally urged by a spring 184 against contact 181. Vane 182 is pivoted upon a grounded pivot 183. The vane 182 is impinged upon by an air current represented by arrow 186 produced by the engine cooling fan 185. Switch 180 opens at a vehicle speed lower than the speed at which air switch 130 closes.

The operation of the auxiliary circuit is as follows: When the ignition switch 103 is closed, the circuit between the battery 54 and the coil 142 of relay 140 is completed to effect attraction of armature 143 thereby causing contact 152 to engage contact 153 and contact 144 to separate from contact 145. Then the circuit between battery 54 and coil 172 of relay 170 is completed to cause armature 176 to move toward and to seal against the core 171 and to close contacts 178 and 179.

The circuit which momentarily renders the ignition inoperative is an ignition coil short circuit which includes wire 107, wire 147, terminal 146, contacts 144—145 of relay 140, contacts 178—179 of relay 170 and contacts 181—182 of air switch 180. Upon the closing of ignition switch 103, contacts 144—145 open ahead of the closing of contacts 178—179. Hence the ignition coil short circuit is never completed until the switch 160 is opened. The closing of the ignition switch 103 merely preconditions the auxiliary system so that, when it is desired to shift from one gear train to another (not the overdrive gearing), the opening of the switch 160 to permit said shifting to be done will cause the auxiliary system to render the ignition momentarily non-operative.

The opening of switch 160 interrupts the circuit between battery 54 and relay coil 140 thereby causing relay armature to move upwardly to separate contacts 152 and 153 (which control coil 172 of relay 170) and to reengage contacts 144—145 thereby completing the ignition short circuit to ground. The armature 176 of relay 170 is not released immediately upon the separation of contacts 152—153 of relay 140. Due to the elements 175 and 171a and to the fact that the armature 176 seals against the core 171, the contacts 179—178 remain closed for an appreciable time to cause the engine ignition to be rendered non-operative for a time sufficient for the shifting of gear trains.

Above a vehicle speed less than the speed at which switch 130 closes, the switch 180 opens to maintain open-circuited the ignition short circuit controlled by the auxiliary system. Hence the auxiliary system is non-operative over the speed range within which the overdrive control is operative.

To secure more uniform operation, the cores or the armatures of relays 80 and 170 should be chromium plated so that the armatures do not seal against the cores with iron-to-iron contact. The reasons for this are fully disclosed in my copending application Serial No. 290,356 filed August 16, 1939.

While the embodiment of the present invention as herein disclosed, constitutes a preferred form, it is to be understood that other forms might be adopted, all coming within the scope of the claims which follow.

What is claimed is as follows:

1. An ignition control system for automotive use comprising a current source, electrical ignition apparatus, a switch for connecting the ignition apparatus with the battery, means for withholding the operation of the ignition apparatus for a predetermined time, means responsive to the closing of the ignition switch for preconditioning said ignition withholding means for operation, and means controlled by the driver for rendering the ignition withholding means effective.

2. An ignition control system for automotive use comprising a current source, electrical ignition apparatus, a switch for connecting the ignition apparatus with the battery, means for withholding the operation of the ignition apparatus for a predetermined time, means responsive to the closing of the ignition switch for preconditioning said ignition withholding means for operation, means controlled by the driver for rendering the ignition withholding means effective and means responsive to vehicle speed for causing the ignition withholding means to be ineffective.

3. An ignition control system for automotive use comprising a current source, electrical ignition apparatus, a switch for connecting the ignition apparatus with the battery, a measured-time relay having a switch normally positioned for the purpose of permitting operation of the ignition but movable to a position for withholding operation of the ignition when its magnet coil is energized, and a control relay having its magnet coil energized in response to the closing of the ignition switch and having a switch closed in response to energization of its magnet coil for the purpose of connecting the current source with the measured-time relay magnet coil and having a second switch in series with the measured time relay switch and being normally in position to control a circuit to render the ignition inoperative but which moves to a position for the purpose of permitting operation of the ignition when the control relay magnet coil is energized, and means under the control of the driver for rendering the control relay inoperative.

4. An ignition control system for automotive use comprising a current source, electrical ignition apparatus, a switch for connecting the ignition apparatus with the battery, a measured-time relay having a switch normally positioned for the purpose of permitting operation of the ignition but movable to a position for withholding operation of the ignition when its magnet coil is energized, and a control relay having its magnet coil energized in response to the closing of the ignition switch and having a switch closed in response to energization of its magnet coil for the purpose of connecting the current source with the measured-time relay magnet coil and having a second switch in series with the measured time relay switch and being normally in position to control a circuit to render the ignition inoperative but which moves to a position for the purpose of permitting operation of the ignition when the control relay magnet coil is energized, means under the control of the driver for rendering the control relay inoperative and a vehicle speed responsive switch in series with the measured-time relay switch and with the second switch of the control relay, said vehicle speed switch being normally in a position for rendering the ignition inoperative but movable upon attainment of a certain vehicle speed to render the control relay and measured-time relay ineffective to control the ignition.

5. An ignition control system for automotive use comprising a current source, electrical ignition apparatus, a switch for connecting the ignition apparatus with the battery, an automobile overdrive, an overdrive operating solenoid, a measured-time relay having a switch normally in position for permitting operation of the ignition apparatus but movable to a position to render the ignition inoperative when the magnet coil of the measured time relay is energized, a control relay rendered operative in response to the attainment of a certain vehicle speed and having a switch normally in position to control a circuit for the purpose of rendering the ignition inoperative but movable upon energization of the control relay to a position for permitting operation of the ignition, said control relay having a second switch closed upon energization of said control relay to render the overdrive solenoid and the measured time relay operative, driver controlled means for rendering said control relay inoperative, and a second measured time relay having a switch normally in position for the purpose of permitting operation of the ignition but movable into a position for withholding operation of the ignition when its magnet coil is energized, a second control relay having its magnet coil energized in response to the closing of the ignition switch having a switch closed in response to the energization of its magnet coil for the purpose of connecting the current source with the second measured-time relay magnet coil, said second control relay having a second switch in series with the second measured-time relay switch and being normally in position to control a circuit to render the ignition inoperative but movable into a position for the purpose of permitting operation of the ignition when the second control relay magnet coil is energized, means under the control of the driver for rendering the second control relay operative, and means responsive to the attainment of a speed below the speed range throughout which the first mentioned control relay is operative for rendering the second control and measured-time relays ineffective to render the ignition inoperative.

6. An ignition control system for automotive use comprising a current source electrical ignition apparatus, two time-lag relays operative to withhold ignition for a predetermined time, two control relays respectively operative to precondition the time-lag relays for operation, switches under driver control for respectively rendering the control relays inoperative to maintain the energization of the time-lag relays whereby, during the flux decay periods thereof, operation of ignition is withheld, a vehicle speed responsive switch operative throughout a certain speed range to render one of the control relays effective to precondition its associated time-lag relay, and a second vehicle speed responsive switch normally controlling a circuit to maintain the effectiveness of the other control relay and its associated time-lag relay to control the ignition only throughout a speed range below that speed range of the first mentioned vehicle-speed responsive switch throughout which the relays associated therewith are effective to control the ignition.

EDWARD M. CLAYTOR.